United States Patent [19]

Teyssie et al.

[11] 4,419,482
[45] Dec. 6, 1983

[54] PRODUCTS CONTAINING POLYMER CHAINS, THE PREPARATION AND USE THEREOF

[75] Inventors: Philippe J. Teyssie, Neuville-en-Condroz; Robert J. Jérome, Tilff-Esneux; Guy J. Broze, Grace-Hollogne, all of Belgium

[73] Assignee: Unibra Societe Anonyme, Brussels, Belgium

[21] Appl. No.: 345,102

[22] Filed: Feb. 2, 1982

[30] Foreign Application Priority Data

Feb. 2, 1981 [LU] Luxembourg ............... 83106

[51] Int. Cl.³ .................................................. C08K 5/01
[52] U.S. Cl. .................................... 524/560; 524/565; 524/571; 524/577; 524/580; 525/328.9; 525/329.1; 525/329.3; 525/330.6; 525/333.1; 525/333.2; 525/333.3; 525/333.7; 525/343; 525/360; 525/370; 525/409; 525/474; 525/475
[58] Field of Search ............... 525/328.9, 329.3, 330.6, 525/333.1, 333.2, 333.3, 333.7, 343, 370, 360, 409, 474, 475, 329.1; 524/560, 565, 571, 577, 580

[56] References Cited

U.S. PATENT DOCUMENTS

4,005,247 1/1977 Graham ........................... 526/15
4,185,051 1/1980 McKenna, Jr. et al. ......... 525/370
4,292,231 9/1981 Gabriel et al. ............... 260/33.4 UR

*Primary Examiner*—Joseph L. Schofer
*Assistant Examiner*—Bernard Lipman
*Attorney, Agent, or Firm*—Sughrue, Mion, Zinn, Macpeak & Seas

[57] ABSTRACT

The invention relates to a process for preparing products containing polymer chains in which a linear prepolymer or polymer contains at least one free acid group at each chain and is reacted with an alkoxide of a metal having a valence of more than 2, such as zirconium, titanium or cerium, possibly in the presence of a non polar solvent, the alkoxide of the metal having a valence of more than 2 being used in such a quantity that the alkoxide functions are in excess with respect to the stoichiometric amount of the acid functions carried by said linear prepolymer or polymer, the reaction mixture being stirred in the presence of humidity until a product is obtained wherein the hydrogen atoms of the free acid end groups of the prepolymer or polymer are substituted by an atom of the metal (M) which is itself linked to another atom of said metal by M-O-M linkages. The invention relates also to the products containing a prepolymer or polymer $\alpha,\omega$-diacid in which the hydrogen atoms of the free acid end groups of the prepolymer or polymer are substituted by an atom of the metal (M) which is itself linked to another atom of said metal by M-O-M linkages, said products being in the form of homogeneous gels in a non polar solvent such as toluene.

26 Claims, 4 Drawing Figures

FIG. 2

PRODUCTS CONTAINING POLYMER CHAINS, THE PREPARATION AND USE THEREOF

THE PRIOR ART

U.S. Pat. No. 4,005,247 describes pressure sensitive adhesive compositions containing an adhesive polymer obtained by reaction of a copolymer or interpolymer containing at least 0.2% by weight of an anhydride of an alpha-beta-unsaturated acid, such as maleic acid, with a preferably chelated alkoxide of a metal selected among the groups II, III, IV and V of the Periodic System. Said reaction takes place in the absence of water, since water hydrolyses and desactivates the alkoxide. In this process, the alkoxide reacts with the acid anhydride without the intervention of water.

The process described in said U.S. Pat. No. 4,005,247 does not use linear polymer containing at least one free acid group at each chain end, nor the reaction of an alkoxide of a metal with such polymers in the presence of humidity or water.

French Pat. No. 2,285,404 describes the preparation of an elastomeric polymer which may be cured by humidity, in which a polymer containing randomly distributed conjugated olefinic unsaturation sites is reacted, under anhydrous conditions, with a cyclic unsaturated anhydride, such as maleic anhydride, and the reaction product is subsequently mixed with an oxide, hydroxide or alkoxide of a polyvalent metal, such as zinc oxide or hydroxide.

In this French patent, it is stated that water is used for hydrolyzing the anhydride groups of the reaction product into acid groups and/or for hydrolyzing the oxide of a polyvalent metal, when such an oxide is used, in the presence of an hydrolysis catalyst.

When an alkoxide is used instead of an oxide of a polyvalent metal, said alkoxide reacts directly with the anhydride groups as mentioned in said U.S. Pat. No. 4,005,247, without the need of previous hydrolysis of said groups and of course without desactivation of the alkoxide itself by hydrolysis, so that the reaction described in the French Pat. No. 2,285,404 does not need water for the cross-linking reaction with a metal alkoxide, the proportion of this alkoxide with respect to the anhydride groups being not indicated in said French patent.

In the process according to the French Pat. No. 2,285,404, the grafting of an unsaturated cyclic anhydride on the randomly distributed conjugated olefinic unsaturation sites of a polymer cannot give products having free acid groups exclusively located at the chain ends.

The process described in the French Pat. No. 2,285,404 does not relate to the use of linear polymers carrying free acid groups at the chain ends, nor the use of alkoxides of metals (M) in such a quantity that the alkoxide functions are in excess with respect to the stoichiometric amount needed for the reaction with said free acid groups, this reaction being followed by the action of humidity for hydrolyzing the alkoxide functions in excess so as to form M-O-M linkages.

It has now been found that it is possible to obtain homogeneous products having remarkable properties and having conversion rates of about 100%, when a linear prepolymer or polymer containing at least one free acid group at each chain end is reacted with an alkoxide of a metal (M) having a valence of more than 2 in such a quantity that the alkoxide functions are in excess with respect to the acid functions present in the prepolymer or polymer and when the reaction mixture is stirred in the contact with humidity, such as liquid water, atmospheric humidity or any other source of humidity, for example hydrated alumina.

BRIEF DESCRIPTION OF THE INVENTION

This invention thus relates to a process for preparing the reaction product of a linear prepolymer or polymer containing at least one free acid group at each chain end, possibly dissolved in a non polar solvent, with an alkoxide of a metal, said process comprising the use of an alkoxide of a metal (M) having a valence of more than 2 in such an amount that the alkoxide functions are in excess with respect of the stoechiometric amount of the acid functions carried by said linear prepolymer or polymer and stirring the reaction mixture in the presence of humidity until a product is obtained wherein the hydrogen atoms of the free acid end groups of the prepolymer or polymer are substituted by an atom of the metal (M), the latter being itself linked to another atom of said metal by M-O-M linkages.

In the process according to the invention, the use of an excess of an alkoxide of a metal having a valence of more than 2, followed by the action of humidity causes this humidity to hydrolyze partially the alkoxide functions (M-OR) in excess when the latter have been fixed to the polymer, so as to form M-OH functions, the latter reacting with the remaining alkoxide (M-OR) functions so as to form M-O-M linkages causing the cross-linking of the system.

When the reaction between the linear prepolymer or polymer having free acid end groups and the alkoxide of the metal having a valence of more than 2 takes place in the absence of a non polar solvent, homogeneous products are obtained wherein the hydrogen atom of the free acid groups is substituted by an atom of the metal which is itself linked to another atom of this metal by M-O-M linkages.

The reaction between the linear prepolymer or polymer having free acid end groups and the alkoxide of the metal having a valence of more than 2 may also take place in a non polar solvent of said prepolymer or polymer. In this case, homogeneous gels of the reaction product are obtained, wherein the hydrogen atom of the free acid groups is substituted by an atom of the metal which is itself linked to another atom of this metal by M-O-M linkages.

As source of humidity, it is possible to use, according to this invention, a mass of water, the atmospheric humidity or any other source of humidity, such as hydrated alumina.

The process according to this invention thus involves a reaction of water with the OR groups of the alkoxide of a metal having a valence of more than 2, said alkoxide being possibly dissolved in a polar solvent.

It has been found that in the process according to this invention, the above reaction takes place with a maximum of completion and a product is obtained, having a maximum cohesion in the pure state.

When the process according to this invention is effected in the presence of a non polar solvent, homogeneous gels are obtained, which are very resistant and thermoreversible in the non polar solvents. Moreover, the gels are stable in the presence of water, so that it is possible not only to prepare said gels, but also to use them under uncontrolled humidity conditions.

A wide range of diacid polymers may be used as linear prepolymers or polymers having free acid end groups, such as polydiene, polyolefin, polyvinyl, alkylene polyoxide, polyacrylic and polysiloxane polymers having free acid end groups.

Carboxylic, sulfonic or phosphonic groups may be used as acid groups.

Particular examples of linear polymers which may be used in the process according to the invention are the polybutadienes $\alpha,\omega$-carboxylic diacids, the polyisoprenes $\alpha,\omega$-carboxylic diacids, the poly-$\alpha$-methylstyrenes $\alpha,\omega$-carboxylic diacids, the poly-tert.-butylstyrenes $\alpha,\omega$-carboxylic diacids, the polystyrenes $\alpha,\omega$-carboxylic diacids, the poly (ethylene oxides)$\alpha,\omega$-carboxylic diacids, the poly(propylene oxides)$\alpha,\omega$-carboxylic diacids, the butadiene-acrylonitrile $\alpha,\omega$-carboxylic diacids and the polyacrylates $\alpha,\omega$-carboxylic diacids.

Examples of non polar solvents which may possibly be used in the process according to the invention are the aliphatic hydrocarbons, such as pentane, hexane, heptane or octane, the alicyclic hydrocarbons, such as decahydronaphthalene, and the aromatic solvents, such as benzene, toluene, tetrahydronaphthalene, the gasoline for motor vehicles, mineral oils and the like, the non polar solvent having preferably a dielectric constant of less than about 5.

The alkoxide of the polyvalent metal may be used as such or dissolved in a solvent. The excess of alkoxide corresponds to a variable number of metals per diacid chain, according to the considered metal, said excess being preferably of more than 1 to 5 metals per diacid chain. The ratio is preferably of 2.5 for titanium and of 1.75 for zirconium.

Examples of polyvalent metals which may be used as alkoxides in the process according to the invention are titanium, zirconium and cerium, although other metals having a valence of more than 2 may also be used.

The alkoxides which may be used in the process according to the invention have the formula M-OR in which M designates a metal having a valence of more than 2 and R represents an alkyl group having a straight or branched chain which may contain about 1 to 6 carbon atoms, preferably 3 to 4 carbon atoms.

The invention also relates to new products formed by a linear prepolymer or polymer containing, at each chain end, at least one acid group, the hydrogen atom of which is substituted by a metal M having a valence of more than 2, said metal being itself linked to another atom of this metal M by M-O-M linkages. The products according to this invention are prepared in the absence of a solvent or in the presence of a non polar solvent, the latter being subsequently removed.

Said products according to this invention may be used for improving the shock resistance of polymers, such as polyvinyl chloride, or for preparing adhesive compositions.

The invention also relates to new products consisting of homogeneous and thermoreversible gels formed in a non polar solvent and comprising a linear prepolymer or polymer containing, at each chain end, at least one acid group, the hydrogen atom of which is substituted by a metal M having a valence of more than 2 itself linked to an atom of said metal by M-O-M linkages.

Examples of gels according to this invention are particularly those formed by or containing the following polymers: polybutadiene $\alpha,\omega$-dicarboxylate, poly-$\alpha$-methylstyrene $\alpha,\omega$-dicarboxylate, poly-tert.-butylstyrene $\alpha,\omega$-dicarboxylate, polystyrene $\alpha,\omega$-dicarboxylate, poly(ethylene oxide) $\alpha,\omega$-dicarboxylate, poly(propylene oxide)$\alpha,\omega$-dicarboxylate, butadiene-acrylonitrile copolymer $\alpha,\omega$-dicarboxylate, polyacrylate $\alpha,\omega$-dicarboxylate and polyisobutylene $\alpha,\omega$-dicarboxylate of titanium, zirconium, cerium or another metal having a valence of more than 2, possibly in a non polar solvent.

The above gels may be used for thickening oils and various lubricants.

The invention includes also the formation of said gels on a layer of petroleum (non polar solvent) floating on water, such as sea water. In this particular embodiment of the process according to the invention, this process allows the skinning or removal of the formed gel, so that the mass of water becomes substantially free of petroleum. The importance of this embodiment of the process according to the invention is obvious, for solving the pollution problems caused by the accidental formation of petroleum layers onto the surface of seas and oceans.

This invention finally relates to the use of the gels according to the invention, after partial or total removal of the solvent, for improving the shock or impact resistance of polymers, such as polyvinyl chloride and/or for preparing adhesive compositions.

DETAILED DESCRIPTION OF THE INVENTION

The following examples illustrate the invention.

EXAMPLE 1

Preparation of titanium polybutadiene $\alpha,\omega$-dicarboxylate

In a vessel of 500 ml, 10 g ($2.17 \times 10^{-3}$ mols) of polybutadiene $\alpha,\omega$-carboxylic acid (HYCAR CTB of Goodrich, $\overline{M}n = 4600$) are dissolved in 200 ml of pure toluene (Baker).

1.9 ml of titanium n-butoxide ($5.43 \times 10^{-3}$ mols) (Ti(OBu)$_4$, Fluka) are then added and the solution is vigorously stirred by means of a spatula. The viscosity of the reaction medium increases until a homogeneous gel is obtained.

The gelling speed increases when the stirring is more vigorous, i.e. when more atmospheric humidity is introduced in the reaction medium.

Figure 1:
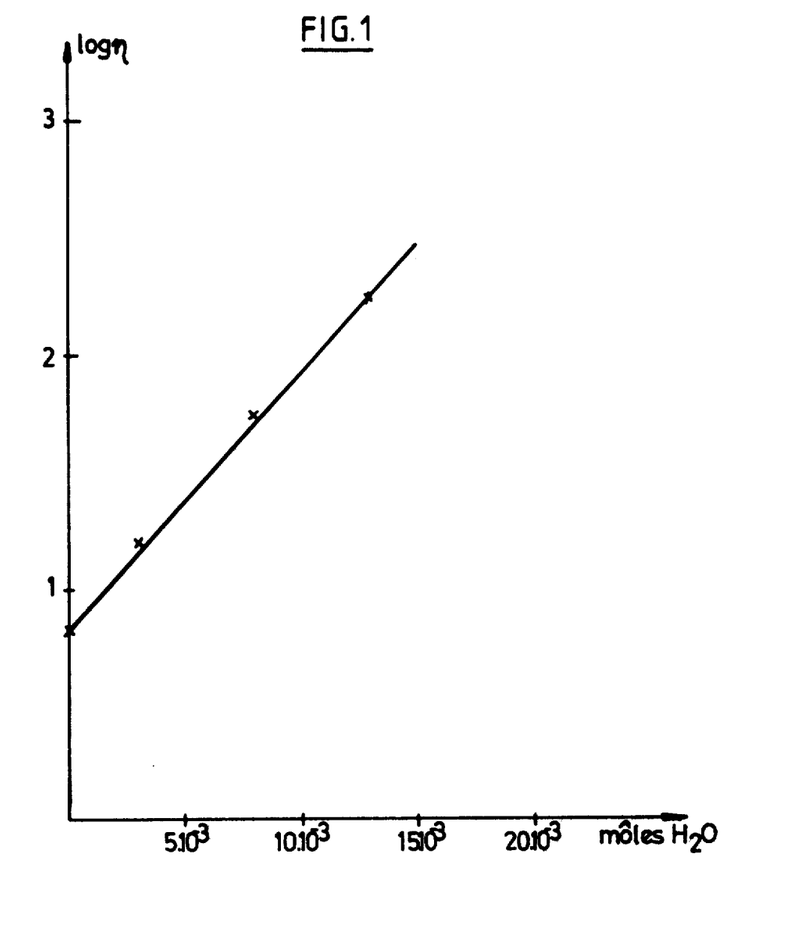

The influence of said humidity is shown by the attached FIG. 1, wherein the log of the viscosity (in ordinate) is plotted against the amount of water (in abscissa) introduced by addition in 50 ml of the solution. The equilibrium viscosity reaches 1800 poises and the product has then the aspect of a gel.

The presence of humidity is necessary for the gelling of the medium, due to the formation of Ti-O-Ti linkages. Indeed, when the reaction takes place under anhydrous conditions, an increase of the viscosity of the medium takes place, but without any geling.

Figure 2:
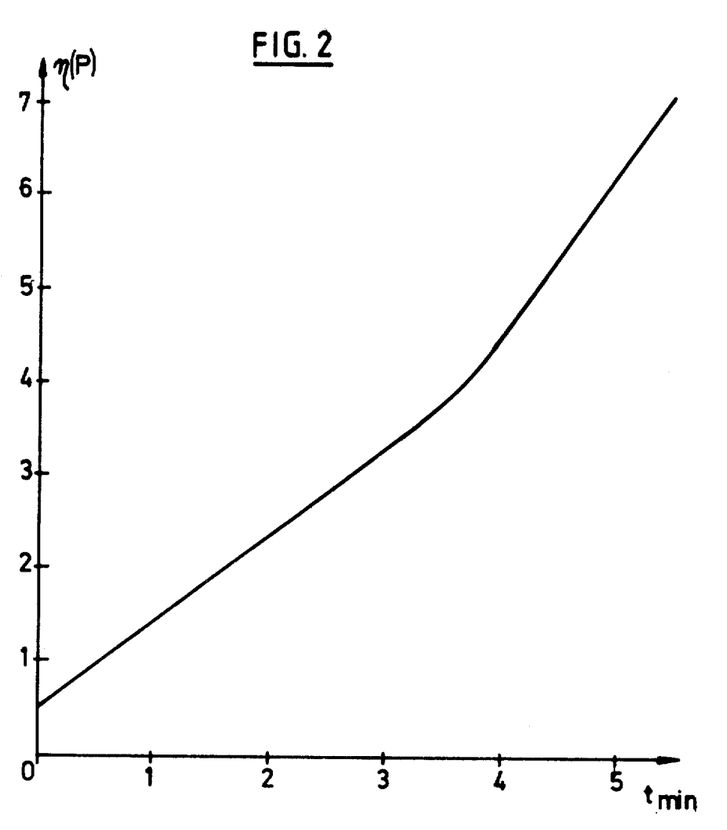

The rheopectic character of the reaction medium is illustrated by the attached FIG. 2, in which the viscosity (in ordinate) of the initially anhydrous medium contacted with atmospheric humidity is plotted against the time in minutes (in abscissa). This viscosity is measured by means of a Heake viscosimeter equipped with concentric cylinders. The gradient of the shearing speed is of 1 sec$^{-1}$.

Figure 3:
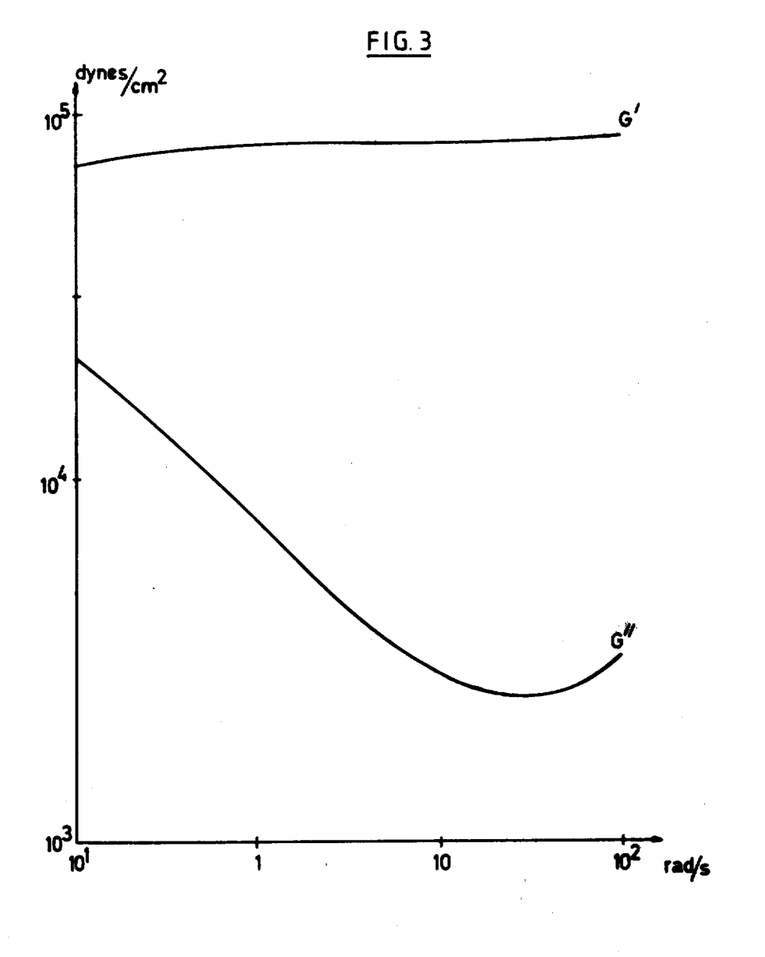

The rheological characteristics of the gel are determined at 23° C. by means of the mechanical spectrometer RHEOMETRICS. RMS 7200, working between parallel plates. The evolution of the conservation modulus G' and of the loss modulus G" as a function of the angular pulsation ω is illustrated in the attached FIG. 3. G' is substantially independent from ω, whereas G" has a minimum. This behavior shows typically that the system is gelled. The equilibrium modulus $G_{eq}$, i.e. the value of G' at the minimum of G", is equal to 91000 dynes/cm2.

Figure 4:
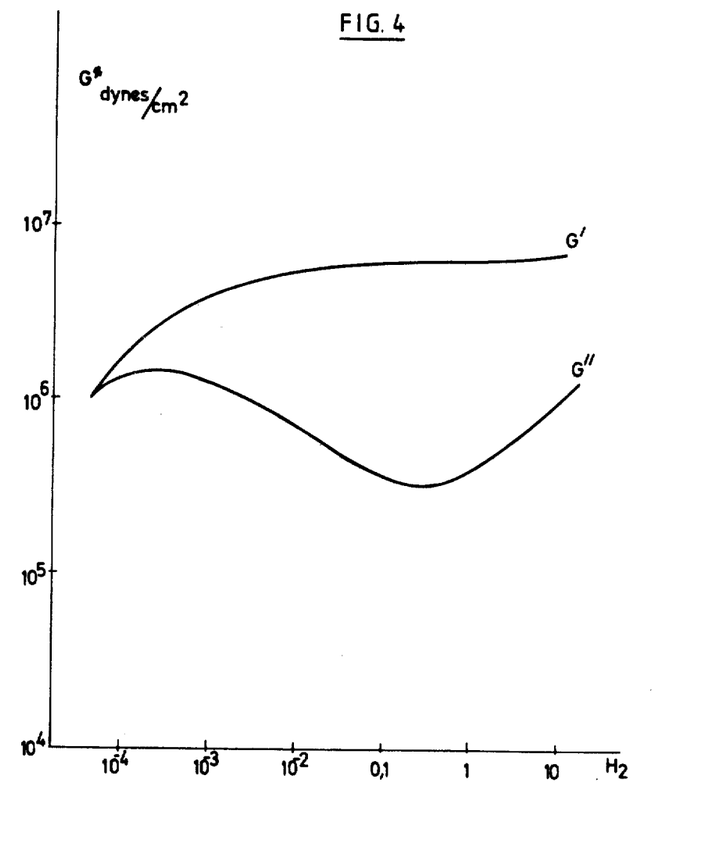

After removal of the solvent under vacuum, a material appearing as a gum is obtained. The rheological features of this gum have been determined (see attached FIG. 4). At a temperature of 23° C. and a frequency of 0.25 Hz, G' is equal to $6.3 \times 10^6$ dynes/cm2 and G" has a minimum at $0.32 \times 10^6$ dynes/cm2. The end of the rubber plate appears at $5.10^{-5}$ Hz. At the frequency of 1 Hz, the end of the rubber plate would appear at an estimated temperature of 226° C. (the activation energy is of $14.3 \pm 0.5$ Kcal/mol).

EXAMPLE 2

Preparation of titanium polyisoprene α,ω-dicarboxylate

A polyisoprene α,ω-carboxylic diacid having a molecular weight ($\overline{M}n$) of 16,000 is first prepared as follows:

(a) Preparation of a naphthalene-sodium complex 1 g freshly pickled sodium and 1.28 g of pure naphthalene (Aldrich) are introduced into a dry balloon-flask of a capacity of 250 ml, under a dry nitrogen stream. 100 ml of tetrahydrofuran dried by reflux on a benzophenone-sodium complex and distilled just prior its use are then added under an atmosphere of dry nitrogen. After stirring during 4 hours at room temperature, the naphthalene-sodium complex is formed; the concentration of this complex is of 0.1 mol/liter.

(b) Preparation of polyisoprene α,ω-carboxylic diacid
62.5 ml of the solution of the naphthalenesodium complex ($6.25 \times 10^{-3}$ mols) as prepared above are poured into a balloon-flask of 1 liter containing 300 ml of tetrahydrofuran which has been previously dried as indicated above, at room temperature and under an atmosphere of dry nitrogen.

1.7 ml of α-methylstyrene (Aldrich) previously dried on calcium hydride (Fluka) and distilled under vacuum are then added. The vessel is then immersed in a bath of acetone saturated with $CO_2$ ice ($-78°$ C.).

After 30 minutes, 73 ml of isoprene (Aldrich) (0.74 mols), dried on calcium hydride, are added drop by drop during about 15 minutes and, after a new period of 15 minutes, an excess of gaseous $CO_2$ is added by means of a capillary tube (inner section: at least 1 mm2). The solution loses its color and gels. After addition of 1 ml of a concentrated aqueous solution of hydrochloric acid, the polymer is precipitated into 5 liters of technical methanol, filtered and dried under vacuum.

The molecular mass of the product is of 16 000 (GPC) and its functionality, determined by titration of the acid functions, is of more than 1.95 (acid groups per chain).

(c) Preparation of titanium polyisoprene α,ω-dicarboxylate (PiP-Ti)

10 g of polyisoprene α,ω-carboxylic diacid having a $\overline{M}n$ of 16,000 ($0.63 \times 10^{-3}$ mols) prepared as described above under b) are dissolved in 100 ml of toluene. 0.53 ml of titanium n-butoxide (Fluka) ($1.57 \times 10^{-3}$ mols) are then added to the polymer solution. The obtained solution is vigorously stirred by means of a spatula, as in example 1. After a few minutes of stirring, a homogeneous gel is obtained. The equilibrium modulus measured at 25° C. is of $8.2 \times 10^4$ dynes/cm2.

An identical synthesis made by means of a polyisoprene α,ω-carboxylic diacid of a $\overline{M}n = 10,000$ gives a gel having an equilibrium modulus of $10.8 \times 10^4$ dynes/cm2.

It appears that the molecular mass of the polyisoprene has, in this field, no determining influence on the equilibrium modulus of the obtained gels; the modulus is of about $10^5$ dynes/cm2. An increase of the $\overline{M}n$ causes a slight decrease of this modulus.

EXAMPLE 3

Preparation of titanium polybutadiene α,ω-dicarboxylate

In vessels of 500 ml, 5 g ($1.1 \times 10^{-3}$ mols) of polybutadiene α,ω-carboxylic diacid (CTB Hycar of Goodrich, $\overline{M}n = 4,600$) are dissolved in various volumes of pure decahydronaphthalene (pure decaline of Baker) so as to obtain polymer concentrations from 1.5 to 24 g/dl.

To the various solutions, 1.0 ml ($2.94 \times 10^{-3}$ mols) of titanium n-butoxide are added and the reaction mixture is vigorously stirred with a spatula until a homogeneous gel is obtained. The formation of the gel is more rapid when the polymer concentration is high.

The conservation modulus at 1 Hz and at 23° C. of the various obtained gels is given in the following table I:

TABLE I

| Concentration C (g/dl) | Log G' (1Hz, 23° C.) |
|---|---|
| 1.5 | 2.60 |
| 2.2 | 3.45 |
| 4.0 | 4.25 |
| 5.0 | 4.44 |
| 10 | 5.10 |
| 17 | 5.49 |
| 24 | 5.69 |
| 91 | 6.82 |

From these experimental values, it results that, when C is of more than 2, the conservation modulus at 1 Hz is given by the following equation:

$$G'(1 \text{ Hz}, 23° \text{C.}) = 1260 \, C^{1.9}$$

G' being expressed in dynes/cm2 and C in g/dl.

At a concentration of 1.2 g/dl, no gel is obtained and a viscous liquid is formed.

The critical gelling concentration is therefore comprised between 1.2 g/dl and 1.5 g/dl.

EXAMPLE 4

Preparation of titanium polystyrene α,ω-dicarboxylate (a) Preparation of polystrene α,ω-carboxylic diacid A polystyrene α,ω-carboxylic diacid having a $\overline{M}n$ of 10,000 is first prepared as follows:

In a balloon-flask, which has previously been dried and placed under nitrogen, 300 ml of dry tetrahydrofuran (dried as in part (a) in example 2), 100 ml of a solution of a naphthalene-sodium complex ($10^{-2}$ mols) (prepared as described in part (a) of example 2) and 2.7 ml of α-methylstyrene (Aldrich) previously dried on calcium hydride (Fluka) and distilled under vacuum are introduced.

The flask is then immersed into a bath of acetone saturated with $CO_2$ ice ($-78°$ C.). After 30 minutes, 50 g (0.48 mol) of styrene (Aldrich) dried on calcium hydride and distilled under vacuum are dried drop by drop within about 15 minutes. After a new period of 15 minutes, an excess of gaseous $CO_2$ (as described in part (b) of example 2) is added by means of a capillary tube made of stainless steel. The solution loses its colors and gels. After introduction of 1 ml of a concentrated aqueous solution of hydrochloric acid, the polymer is precipitated into 5 liters of technical methanol, filtered and dried under vacuum.

The moleclar mass of this polymer is of 10,000 (GPC) and its functionality is of more than 1.95 (titration).

(b) Preparation of titanium polystyrene α,ω-dicarboxylate (PST-Ti)

10 g of polystyrene α,ω-carboxylic diacid of a $\overline{M}n$ of 10,000 ($10^{-3}$ mols) prepared as described above are dissolved into 100 ml of toluene. 0.85 ml ($2.5 \times 10^{-3}$ mols) of titanium n-butoxide (Fluka) are then added to the polymer solution. This solution is then vigorously stirred by means of a spatula, as described in example 1. After a few minutes, a homogeneous gel is obtained.

EXAMPLE 5

Preparation of titaium poly(tert.-butylstyrene)α,ω-carboxylic diacid (a) Preparation of poly(tert.-butylstyrene)α,ω-carboxylic diacid A poly(tert.butylstyrene)α,ω-carboxylic acid having a Mn of 10,000 is first prepared in the manner described in example 4 for the polystyrene α,ω-carboxylic diacid, except that the 50 g of styrene are replaced by 50 g of tert.-butylstyrene, dried on calcium hydride (Fluka) and then distilled under vacuum.

(b) Preparation of titanium poly-tert.-butylstyrene α,ω-dicarboxylate 10 g ($10^{-3}$ mols) of poly(tert.-butylstyrene)α,ω-carboxylic diacid of a $\overline{M}n$ of 10,000, prepared as described above, are dissolved in 100 ml of toluene. 0.85 ml of titanium n-butoxide ($2.5 \times 10^{-3}$ mols) (Fluka) are then added to the polymer solution. The solution is vigorously stirred by means of a spatula, as described in example 1. After a few minutes of stirring, a homogeneous gel is obtained.

EXAMPLE 6

Preparation of titanium poly-α-methylstyrene α,ω-dicarboxylate (a) Preparation of a poly-α-methylstyrene α,ω-carboxylic diacid A poly-α-methylstyrene α,ω-carboxylic diacid of a Mn of 10,000 is first prepared as follows:

300 ml of dried tetrahydrofuran (dried as described in part (a) of example 2), 100 ml of the solution of naphthalene-sodium complex (prepared in part (a) of example 2) ($10^{-2}$ mols) and 50 g of α-ω methylstyrene (0.42 mol) (Aldrich) previously dried on calcium hydride (Fluka) and distilled under vacuum are introduced into a balloon of 1 liter previously dried and placed under nitrogen. The balloon is then immersed in a bath of acetone at room temperature. This bath is then progressively dried to a temperature of $-78°$ C. by addition of $CO_2$ ice. After 15 minutes at this temperature, an excess of gaseous $CO_2$ is introduced into the balloon by means of a capillary tube in stainless steel having one end immersed in the solution. The red solution its color while gelling.

After introduction of 1 ml of an aqueous concentrated solution of hydrochloric acid, the polymer is precipitated in 5 liters of technical methanol and dried under vacuum.

(b) Preparation of titanium poly-α-methylstyrene α,ω-dicarboxylate (PMST-Ti)

10 g of poly-α-methylstyrene α,ω-carboxylic diacid having a $\overline{M}n$ of 10,000 ($10^{-3}$ mols), prepared as described above are dissolved in 100 ml of toluene. 0.85 ml of titanium n-butoxide (Fluka) ($2.5 \times 10^{-3}$ mols) are then added to the polymer solution. The solution is vigorously stirred by means of a spatula, as described in example 1. After a few minutes of stirring, a homogeneous gel is obtained. $G_{eq} = 7.4 \times 10^4$ dynes/cm2.

EXAMPLE 7

Preparation of a random titanium butandiene-acrylonitrile α,ω-dicarboxylate copolymer 5 g ($1.4 \times 10^{-3}$ mols) of the random butadiene-acrylonitrile copolymer α,ω-carboxylic diacid (HYCAR CTBN $1300 \times 8$ of Goodrich; $\overline{M}n = 3,500$ and acrylonitrile content: 17%) are dissolved in 100 ml of toluene. 1.81 ml of titanium n-butoxide ($3.6 \times 10^{-3}$ mols) are then added.

The solution is vigorously stirred by means of a spatula. After a few minutes, a gel is obtained. The equilibrium modulus of this gel is of $6.9 \times 10^4$ dynes/cm2.

A quite identical behavior is shown by random copolymers containing respectively 10% and 27% of acrylonitrile.

EXAMPLE 8

Preparation of zirconium polybutadiene α,ω-dicarboxylate

In a vessel of 500 ml, 10 g ($2.17 \times 10^{-3}$ mols) of polybutadiene α,ω-carboxylic diacid (Hycar CTB of Goodrich; $\overline{M}n = 4,600$) are dissolved in 200 ml of pure toluene (Baker).

2.43 ml ($5.43 \times 10^{-3}$ mols) of zirconium n-propoxide ($Zr(OC_3H_7)_4 C_3H_7\text{-}OH)_2$—Aldrich) are added and the solution is vigorously stirred by means of a spatula.

The viscosity of the medium considerably increases until a homogeneous gel is obtained.

The more the stirring is powerful and the more atmospheric humidity is quickly introduced into the solution, the more a gel is quickly obtained. The equilibrium modulus of this gel at $23°$ C. is of $1.6 \times 10^5$ dynes/cm2.

EXAMPLE 9

Preparation of zirconium poly(ethylene oxide)α,ω-dicarboxylate (a) Preparation of poly(ethylene oxide)α,ω-carboxylic diacid 20 g ($5 \times 10^{-3}$ mols) of poly(ethylene oxide)α,ω-diol (polyglycol, 4,000, Hoechst EAG, $\overline{M}n = 4,000$) are dissolved in 200 ml of toluene. The obtained solution is treated with an excess of succinic anhydride (2 g-Aldrich) under reflux during 16 hours. The obtained poly(ethylene oxide)α,ω-carboxylic diacid is recovered by precipitation of the solution in 10 times its volume of technical hexane, filtration and drying under vacuum.

The functionality of the acid, measured by titration, is of more than 1.95.

(b) Preparation of zirconium poly(ethylene oxide)α,ω-dicarboxylate 5 g of poly(ethylene oxide)α,ω-carboxylic diacid ($1.25 \times 10^{-3}$ mols) are dissolved in 50 ml of toluene. After addition of 1.4 g ($3.13 \times 10^{-3}$ mols) of zirconium n-propoxide, the solution is vigorously stirred. A gel is quickly obtained. This gel has mechanical properties which are similar to those of the gels prepared in the preceding examples. However, after 24 hours at room temperature and in the presence of air, the gel becomes destroyed and a viscous solution is obtained. On the contrary, when the gel is maintained free from air, its mechanical properties remain unchanged.

EXAMPLE 10

Preparation of zirconium poly(propylene oxide)α,ω-dicarboxylate (PPO-Zr)

(a) Preparation of poly(propylene oxide)α,ω-dicarboxylic acid 20 g ($5 \times 10^{-3}$ mols) of poly(propylene oxide)α,ω-diol ($\overline{M}n = 4,000$, Aldrich) are dissolved in 200 ml of toluene. The obtained solution is treated with an excess of succinic anhydride (2 g, Aldrich) under reflux during 16 hours. The obtained poly(propylene oxide)α,ω-carboxylic diacid is separated as follows:

The toluene solution is treated with $3 \times 100$ ml of a 5% aqueous solution of NaOH and then with $3 \times 100$ ml of an aqueous molar solution of HCl and finally with $4 \times 100$ ml of pure water. The toluene is then evaporated under reduced pressure and the collected polymer has a functionality of carboxylic acid of 1.9.

(b) Preparation of zirconium poly(propylene oxide)α,ω-dicarboxylate 5 g of poly(propylene oxide)α,ω-carboxylic diacid ($1.25 \times 10^{-3}$ mols) are dissolved in 50 ml of toluene. After addition of 1.4 g ($3.13 \times 10^{-3}$ moles) of zirconium n-propoxide the solution is vigorously stirred by means of a spatula. A gel is quickly obtained. This gel has mechanical properties which are similar to those of the gels prepared in the preceding examples and is stable, contrarily to the poly(ethylene oxide) gel.

EXAMPLE 11

Preparaton of zirconium poly(n-butylacrylate)α,ω-dicarboxylate (a) Preparation of poly(n-butyl acrylate)α,ω-carboxylic diacid Under nitrogen, a mixture of 8 g of diazocyanovaleric acid, 25 g of dithiopropionic acid, 120 g of freshly distilled n-butyl acrylate and 400 ml of methanol is added drop by drop to 50 ml of methanol heated to the boiling temperature. The heating is continued during 30 minutes so that the addition of said mixture is completed. The reaction mixture is cooled to $-20°$ C. during 24 hours. The obtained polymer becomes unsoluble and is separated by mere decantation.

The average molecular mass ($\overline{M}n$) is of 16,000 for an ideal functionality of 2 carboxy groups per chain.

(b) Preparation of zirconium poly(n-butyl acrylate)α,ω-dicarboxylate (PBA-Zr)

10 g of poly(n-butyl acrylate)α,ω-carboxylic diacid ($\overline{M}n = 16,000$; $6.23 \times 10^{-4}$ mols) prepared as described above are dissolved in 50 ml of benzene. 0.56 g of zirconium n-propoxide ($1.25 \times 10^{-3}$ mols; Fluka) are then added. The obtained solution is vigorously stirred by means of a spatula as described in example 1. After a few minutes of stirring, a homogeneous gel is obtained. After removal of the toluene under vacuum, the product has an equilibrium modulus G' (Rheometrics, RMS 7200) which varies only slightly with the frequency, i.e. from $1.5 \times 10^6$ dynes/cm2 at 0.016 Hz to $3.5 \times 10^6$ dynes/cm2 at 16 Hz.

EXAMPLE 12

Preparation of alumina-titanium polybutadiene α,ω-dicarboxylate 10 g ($2.17 \times 10^{-3}$ mols) of polybutadiene α,ω-carboxylic diacid (Hycar CTB of Goodrich; $\overline{M}n = 4,600$) are dissolved in 100 ml of toluene. 1.85 ml ($5.4 \times 10^{-23}$ mols) of titanium n-butoxide (Fluka) are then added. The obtained solution is poured into a mortar, in which 1 g of hydrated alumina (Merck) is progressively added (small pinches), while the solution is milled. During this milling, the solution becomes a gel. After 5 minutes, a homogeneous gel is obtained. The equilibrium modulus of this gel at 23° C. reaches a high value of $3.2 \times 10^5$ dynes/cm2.

EXAMPLE 13

Preparation of titanium polybutadiene α,ω-dicarboxylate 10 g ($2.17 \times 10^{-3}$ mols) of polybutadiene α,ω-carboxylic diacid (Hycar CTB of Goodrich; $\overline{M}n = 4,600$) are dissolved in 200 ml of gasoline of the "Super" type for motor vehicles (B.P.). 1.85 ml ($5.4 \times 10^{-3}$ mols) of titanium n-butoxide (Fluka) are added and the solution is vigorously stirred by means of a spatula, until a homogeneous gel is obtained after about 30 seconds. The mechanical properties of this gel are identical to those of the gel of example 1.

When a portion of this gel is deposited on the surface of water, it floats without decomposition. After 48 hours, the gel is still not destroyed by the humidity.

The combustion characteristics of this gel are remarkable. When a fraction of the gel is inflamed, the latter burns slowly and the combustion hearth remains local. The extinction occurs before a complete combustion.

EXAMPLE 14

Preparation of titanium polybutadiene α,ω-dicarboxylate (PBD-Ti)

1 liter of drinking water is poured into a crystallizer having a diameter of 20 cm. 200 ml of gasoline of the "Super" type for motor vehicles (B.P.) are poured onto the water bath. 10 g ($2.17 \times 10^{-3}$ mols) of polybutadiene α,ω-carboxylic diacid (Hycar CTB of Goodrich, $\overline{M}n = 4,600$) are dissolved in the gasoline. After addition of 1.85 ml ($5.4 \times 10^{-3}$ mols) of titanium n-butoxide (Fluka), the mixture is vigorously stirred by means of a spatula. A gel is quickly obtained and the whole of the gasoline is incorporated in said gel. The gel may then be skimmed from the water which becomes practically free from gasoline.

EXAMPLE 15

Preparation of cerium polybutadiene α,ω-dicarboxylate

Cerium butoxide of the formula:
Ce(O—CH$_2$—CH$_2$—CH$_2$—CH$_2$)$_4$.

is first prepared by the method described by D. C. Bradley, A. K. Chatterjee and W. Wardlaw (J. Chem. Soc., 2260, 1956).

To 12 g ($2.6 \times 10^{-3}$ mols) of polybutadiene α,ω-dicarboxylic acid (Hycar CTB of Goodrich, $\overline{M}n=4,600$) dissolved in 100 ml of toluene. $6.5 \times 10^{-3}$ mols of cerium butoxide are added. The solution is vigorously stirred by means of a spatula. A gel is quickly obtained. The properties of this gel are very interesting since, at 23° C. and at a frequency of 1 Hz, the conservation modulus exceeds one million dynes/cm2 ($1.05 \times 10^6$ dynes/cm2).

EXAMPLE 16

Preparation of titanium polybutadiene α,ω-dicarboxylate

Polybutadiene α,ω-carboxylic diacids of different molecular masses are first prepared as follows:

In four balloons of 1 liter A, B, C and D previously dried and placed under a nitrogen atmosphere, containing each 300 ml of dry tetrahydrofuran (dried as described in part (a) of example 2), x ml of the solution of naphthalene-sodium (prepared as described in part (a) of example 2) are poured. y ml of α-methylstyrene (Aldrich) dried on calcium hydride (Fluka) and distilled under vacuum are then added. The balloons are then immersed in baths of acetone saturated with carbon dioxide ice (−78° C.). After 30 minutes, 50 g (0.93 mol) of butadiene, dried on n-butyl-lithium and distilled just before use are added drop by drop through a capillary tube, within 15 minutes, to the content of each balloon. Fifteen minutes later, an excess of gaseous $CO_2$ is introduced in the solution through a capillary tube. The solution loses its color while gelling. After addition of 1 ml of a concentrated aqueous solution of HCl, the polymer is precipitated into 5 liters of technical methanol, filtered and dried under vacuum.

Table II shows the values of x and y in accordance with the desired molecular masses. The functionality is always of more than 1.95.

TABLE II

| Polymer | x (ml) | y (ml) | obtained $\overline{M}n$ |
|---|---|---|---|
| A | 100 | 2.7 | 10,000 |
| B | 83 | 2.3 | 12,000 |
| C | 71 | 1.9 | 14,000 |
| D | 56 | 1.5 | 18,000 |

5 g of the polybutadiene α,ω-carboxylic diacids, prepared as described above, are dissolved in 50 ml of toluene. z ml of titanium n-butoxide (Fluka) are then added and the solution is vigorously stirred by means of a spatula as described in example 1. After a few minutes, a homogeneous gel is obtained with the four polymers. The duration of stirring until a gel is obtained is shorter when the molecular mass Mn has a high value. When $\overline{M}n$ is equal to 18,000, a gel is obtained after stirring during 1 minute, whereas the final gel is obtained after about 3 minutes of stirring when Mn is equal to 10,000.

The following table III gives the values of z and the equilibrium modulus at 25° C. of the various obtained gels.

TABLE III

| Polymer | $\overline{M}n$ | z ml:mols | $G_{eq}$ (dynes/cm²) |
|---|---|---|---|
| A | 10,000 | $0.43:1.25 \times 10^{-3}$ | $2.3 \times 10^5$ |
| B | 12,000 | $0.36:1.04 \times 10^{-3}$ | $1.7 \times 10^5$ |
| C | 14,000 | $0.31:0.89 \times 10^{-3}$ | $2.3 \times 10^5$ |
| D | 18,000 | $0.24:0.69 \times 10^{-3}$ | $1.9 \times 10^5$ |

Table III shows that the equilibrium modulus is not significantly affected by the molecular mass of the used polymer in the studied system. Since less titanium alkoxide is needed for obtaining a gel when using a polymer having a high molecular mass, it appears that a polymer having a molecular mass ($\overline{M}n$) of about 15,000 to 20,000 is economically suitable.

EXAMPLE 17

Preparation of zirconium polyisobutylene α,ω-idcarboxylate 10 g ($4.5 \times 10^{-3}$ mols) of polyisobutylene α,ω-carboxylic diacid having an average molecular mass in number ($\overline{M}n$) of 2,200 (CTPIB, EMO 590 of Exxon) are dissolved in 50 ml of toluene. 4.1 g ($9.10^{-3}$ mols) of zirconium n-propoxide (Alfa) are then added and the mixture is vigorously stirred by means of a spatula, in order to incorporate moist air. After a stirring during about 5 minutes, a homogeneous gel is obtained. This gel has rheological properties which are similar to those of the gels described in the preceding examples.

EXAMPLE 18

Preparation of zirconium polybutadiene α,ω-dicarboxylate 10 g ($2.17 \times 10^{-3}$ mols) of polybutadiene α,ω-carboxylic diacid (Hycar CTB of Goodrich) are dissolved in 100 ml of a mineral oil. 2.4 g ($5.4 \times 10^{-3}$ mols) of zirconium n-propoxide (Alfa) are then added and the mixture is stirred by means of a spatula during about 5 minutes. The viscosity of the mixture gradually increases and finally a homogeneous gel is obtained.

In this case, the product obtained by reacting polybutadiene α,ω-carboxylic diacid and zirconium n-propoxide is a thickening agent of the mine oil.

The rheological properties of the gel prepared in the present example, measured by mechanical spectrometry (Rheometrics RMS 7200) are given in the following table IV, which shows particularly the values of the conservation modulus G' and of tg δ at various temperatures. For this gel, the ratio (Zr)/(PBD) is of 2.

TABLE IV

| Temperature °C. | G' (1 Hz) (dynes/cm²) | tg δ |
|---|---|---|
| 24 | $1.82 \times 10^4$ | 0.63 |
| 43 | $1.38 \times 10^4$ | 0.78 |
| 63 | $0.93 \times 10^4$ | 0.93 |
| 86 | $0.69 \times 10^4$ | 0.95 |

It is to be noted that the gel state is maintained until 86° C., since tg δ remains smaller than 1 (G'>G"). Moreover, the conservation modulus is maintained at an acceptable level. The energy of activation of the flow of this gel has been estimated at a value of 5.9 Kcal/mol. This means that the dynamic viscosity decreases by a factor of 2 for a temperature increase of 23° C. between 0° and 100° C. The viscosity of this gel is of 7,500 poises, at 24° C. and at 1 rad/sec. The viscosity of the starting oil is only of 5 poises at 25° C.

For comparison purposes, two similar systems containing less zirconium have been prepared:

First system: 0.6 g of zirconium n-propoxide;

$$\text{ratio } \frac{(Zr)}{(PBD)} = 0.5$$

Second system: 1.2 g of zirconium n-propoxide;

ratio: $\frac{(Zr)}{(PBD)} = 1.0$

The flow viscosity of these systems has been measured by mechanical spectrometry (Rheometrics RMS 7200) working between the cone and the plate constantly rotating.

The mixture of oil+10% of PBD diacid (PBD=polybutadiene) has a viscosity of 7.5±0.5 poises and is slightly rheofluidizing.

The first system $$\left(\frac{(Zr)}{(PBD)} = 0.5\right)$$

is newtonian at least until $\dot{\gamma} = 100$ sec.$^{-1}$; the dynamic viscosity is of 100±3 poises at 1 rad/sec. No normal force is disclosed, the behavior being essentially viscous.

The second system $$\left(\frac{(Zr)}{(PBD)} = 1.0\right)$$

is rheothickening for $\dot{\gamma} = 0.1$ sec.$^{-1}$ and a normal force is measured, showing an elastic component. The viscosity is of 2,100 poises at 1 rad/sec. For the reduced deformation speeds, ($\dot{\gamma} \simeq 0.1$ sec.$^{-1}$), the $\sigma_{12}$ parameter (which, when divided by the speed gradient $\dot{\gamma}$, gives the viscosity $\eta$) is related to the speed gradient by the following equation:

$$\sigma_{12} = 3.4 \times 10^4 \delta^{1.2}$$

The exponent of more than 1 shows a rheothickening behavior. The first difference of normal forces ($\sigma_{11} - \sigma_{22}$) is related to the speed gradient by the following equation:

$$\sigma_{11} - \sigma_{22} = 2.5 \cdot 10^5 \dot{\gamma}^2$$

For a ((Zr)/(PBD)) ratio of 1.5, the dynamic viscosity is equal to 7,000 poises at 1 rad/sec.

Under these circumstances, by changing only the Zr/PBD ratio, it is possible to go from a strictly viscous medium $$\left(\frac{(Zr)}{(PBD)} = 0.5\right)$$

to a completely gelled medium $$\left(\frac{(Zr)}{(PBD)} = 1.5 \text{ and } 2\right),$$

passing through intermediate states $$\left(\frac{(Zr)}{(PBD)} = 1\right).$$

EXAMPLE 19

Improvement of the impact resistance of polyvinyl chloride (PVC) by addition of titanium or zirconium polybutadiene (PBD) α,ω-dicarboxylate A mixture of titanium (or zirconium) PBD α,ω-dicarboxylate and of PVC is prepared as follows:

12 g (2.16 × 10$^{-3}$ mols) of PBD α,ω-carboxylic diacid (Hycar CTB of Goodrich, $\overline{M}n = 4,600$) are dissolved in 60 ml of benzene and treated with 2.2 ml of titanium n-butoxide (6.5 × 10$^{-3}$ mols). The mixture is poured into a mortar and mixed with 30 g of PVC (Solvic of Solvay) which has been stabilized by means of 2% of dibutyl-tin octanoate. After vigorous stirring during 5 minutes, a yellow powder is obtained. The benzene is evaporated under reduced pressure. This mixture is mixed in a roller mixer at 200° C. to 120 g of PVC containing 1% of tin octanoate as stabilizing agent. After 10 minutes of mixing, the mixture is molded and submitted to the Charpy test (DIN 53453-1958) of impact resistance.

The results of the tests are shown in the following table V.

TABLE V

| Composition (%) | | | | Impact |
|---|---|---|---|---|
| Pure PVC | PVC premixed with PBD | | M | kg cm/cm³ |
| | PVC | PBD | | |
| 100 | 0 | 0 | — | 7.7 |
| 88.5 | 4 | 7.5 | Ti | 9.3 |
| 85 | 7.5 | 7.5 | Ti | 20.2 |
| 74 | 18.5 | 7.5 | Ti | 13.9 |
| 61.5 | 31 | 7.5 | Ti | 11.2 |
| 88.5 | 4 | 7.5 | Zr | 13.9 |
| 85 | 7.5 | 7.5 | Zr | 18.1 |
| 74 | 18.5 | 7.5 | Zr | 16.8 |
| 61.5 | 31 | 7.5 | Zr | 12.7 |

This table shows clearly the remarkable improvement of the impact resistance obtained when a minor amount of a prepolymer or polymer α,ω-dicarboxylate of a metal having a valence of more than 2 is added to PVC.

EXAMPLE 20

Adhesive properties

The solvent of the gels prepared as described in examples 1, 2, 11, 16 and 17 is removed by evaporation under vacuum. These gels may also be prepared in the absence of any solvent, as described in examples 22 and 23.

The obtained products have the features of adhesives of the "hot-melt" type. Stainless steel plates are glued together on a surface having a width of 1 inch and a length of 2 inches and are heated under pressure at 120° C. during 3 minutes. The glued surfaces are submitted to a shearing force by means of an Instron tensile machine working at a constant speed of 5 mm/minute (ASTM-D 1002-64).

The results expressed in kg/cm2 are indicated in the following table VI.

TABLE VI

| Adhesive | Average of 3 tests |
|---|---|
| PIP 10,000 Ti (example 2) | 21.6 |
| idem aged during 40 days | 24.0 |
| PIP 16,000 Ti (example 2) | 14.4 |
| idem aged during 40 days | 20.0 |
| PBD 4,600 Ti (example 1) | 8.0 |
| Araldite (Ciba Geigy | |

TABLE VI-continued

| Adhesive | Average of 3 tests |
|---|---|
| Hardener 927576 - reserve 927536) } | 11.4 |

It thus appears that the performances of the products of the PIP-Ti type are very interesting. Moreover, an ageing at room temperature substantially improves the adhesion. This may be due to an increased stiffness within the PIP, mainly by cross-linking at the level of the titanium atoms (more complete reaction with water).

EXAMPLE 21

Preparation of zirconium polybutadiene α,ω-dicarboxylate in the absence of a solvent A. First embodiment 200 g ($4.34 \times 10^{-2}$ mols) of polybutadiene α,ω-carboxylic diacid having a $\overline{M}n$ of 4,600 (Hycar CTB of Goodrich) are treated with 29 ml ($6.87 \times 10^{-2}$ mols) of zirconium n-propoxide in a mortar. After a vigorous stirring by means of a spatula during 15 minutes, a gummy product is obtained. This product is then milled during 8 minutes at 150° C. in a roller mill. The product becomes more cohesive and less tacky, while a release of n-propanol takes place.

B. Second embodiment 200 g of polybutadiene α,ω-carboxylic acid (Hycar CTB of Goodrich, $\overline{M}n = 4,600$) are treated tiwh 29 ml of zirconium n-propoxide in an inner mixer heated at 100° C. (Brabender plastograph). The material remains tacky after 15 minutes of mixing; it is then milled at 180° C. during 6 minutes in a roller mill. A product similar to that obtained in the first embodiment is obtained.

The products obtained in examples 21A and 21B have been compared to the equivalent product prepared in toluene (example 8) and recovered after removal of the solvent under vacuum.

Table VII shows the value, expressed in dynes/cm2, of the torsion modulus measured at 25° C. for various measure times:

TABLE VII

| Measure time sec. | Example 21A | Example 21B | Example 8 after removal of toluene |
|---|---|---|---|
| 10 | $2.1 \times 10^7$ | $2.5 \times 10^7$ | $3.0 \times 10^7$ |
| 100 | $1.0 \times 10^7$ | $1.6 \times 10^7$ | $1.6 \times 10^7$ |
| 1000 | $0.3 \times 10^7$ | $0.6 \times 10^7$ | $0.55 \times 10^7$ |

It appears that the synthesis effected in the absence of a solvent and with pre-mixing in an inner mixer (example 21B) gives results which are rather similar to those of a synthesis effected in toluene.

EXAMPLE 22

Preparation of zirconium polyisoprene α,ω-dicarboxylate in the absence of a solvent 40 g ($7 \times 10^{-4}$ mols) of polyisoprene α,ω-carboxylic diacid having a $\overline{M}n$ of 57,000 prepared in the manner described in example 2 are milled in a roller mixer at a temperature of 130° C. 0.3 ml ($1.07 \times 10^{-3}$ mols) of zirconium n-propoxide are then added drop by drop. After 8 minutes, the zirconium polyisoprene α,ω-dicarboxylate is recovered.

What is claimed is:

1. A process for preparing products containing polymer chains, in which a linear α,ω-diacid prepolymer or polymer selected from the group consisting of polydienes, polyolefins, polyvinyl polymers, polyacrylic polymers, polyalkylene oxides and polysiloxanes having, only at each chain end, at least one free acid group selected from the the group consisting of carboxylic, sulfonic and phosphonic groups is reacted with an alkoxide of a metal (M) having a valence of more than 2, the amount of alkoxide being such that said alkoxide functional groups are in excess of more than 1 with respect to the stoichiometric quantity of the acid functional groups carried by said linear polymer or prepolymer, the reaction mixture being stirred in the presence of humidity until a product is obtained, in which the hydrogen atoms of the acid groups of said linear prepolymer or polymer are substituted by an atom of the metal which is itself linked to another atom of this metal by M-O-M linkages.

2. A process for preparing products containing polymer chains, in which a linear α,ω-diacid prepolymer or polymer selected from the group consisting of polydienes, polyolefins, polyvinyl polymers, polyacrylic polymers, polyalkylene oxides and polysiloxanes having, only at each chain end, at least one free acid group selected from the group consisting of carboxylic, sulfonic and phosphonic groups is reacted with an alkoxide of a metal (M) having a valence of more than 2, the amount of alkoxide being such that the alkoxide functional groups are in excess of more than 1 with respect to the stoichiometric quantity of the acid functional groups carried by said linear polymer or prepolymer, the reaction mixture being vigorously stirred in the presence of humidity until a product of controlled viscosity is obtained, in which the hydrogen atoms of the acid groups carried by the ends of said linear prepolymer or polymer are substituted by an atom of the metal which is itself linked to another atom of this metal through hydrolysis of the unreacted alkoxide functions into M-O-M linkages between the polymer chains, the excess of alkoxide functional groups being hydrolyzed by the water resulting from the humidity in contact with the reaction mixture.

3. A process according to claim 2, in which the amount of alkoxide is such that the alkoxide functions are in a two-fold–six-fold excess with respect to the acid functions carried by said linear polymer or prepolymer.

4. A process according to claim 2, in which said α,ω-diacid linear prepolymer or polymer is reacted with said metal alkoxide in the absence of any solvent.

5. A process according to claim 2, in which said α,ω-diacid linear prepolymer or polymer dissolved in a non polar solvent is reacted with said metal alkoxide and the non polar solvent is removed after the reaction.

6. A process according to claim 2, in which said metal alkoxide is used in pure state.

7. A process according to claim 2, in which said metal alkoxide is used as a solution of said metal alkoxide in a polar solvent.

8. A process according to claim 2, in which the linear prepolymer or polymer is selected from the group consisting of the polybutadienes α,ω-carboxylic diacids, the polyisoprenes α,ω-carboxylic diacids, the polymethylstyrenes α,ω-carboxylic diacids, the poly-tert.-butylstyrenes α,ω-carboxylic diacids, the polystyrenes α,ω-carboxylic diacids, the poly(ethylene oxides)α,ω-carboxylic diacids, the poly(propylene oxides)α,ω-carboxylic diacids, the butadiene-acrylonitrile copolymers α,ω- carboxylic diacids, the polyisobutylenes α,ω-carboxylic diacids and the polyacrylates α,ω-carboxylic diacids.

9. A process according to claim 2, in which said metal alkoxide contains an alkyl radical having 1 to 6 carbon atoms.

10. A process according to claim 9, in which the alkyl radical contains 3 or 4 carbon atoms.

11. A process according to claim 9, in which a titanium alkoxide is used.

12. A process according to claim 9, in which a zirconium alkoxide is used.

13. A process according to claim 9, in which a cerium alkoxide is used.

14. A process according to claim 5, in which the non polar solvent has a dielectric constant of less than about 5.

15. A process according to claim 5, in which the non polar solvent has a dielectric constant of less than about 5 and is selected among the aliphatic, alicyclic and aromatic solvents.

16. A process according to claim 5, in which the non polar solvent has a dielectric constant of less than about 5 and is selected from the group consisting of pentane, hexane, heptane, octane, decahydronaphthalene, benzene, toluene, tetrahydronaphthalene, gasolines for motor vehicles, petroleum and mineral oils.

17. A process according to claim 2, in which a water layer is used as humidity source.

18. A process according to claim 2, in which the atmospheric humidity is used as humidity source.

19. A process according to claim 2, in which hydrated alumina is used as humidity source.

20. The products formed by or containing linear polymer chains of a α,ω-diacid prepolymer or polymer selected from the group consisting of polydienes, polyolefins, polyvinyl polymers, polyacrylic polymers, polyalkylene oxides and polysiloxanes having, only at each chain end, at least one free acid group selected from the group consisting of carboxylic, sulfonic and phosphonic groups, the hydrogen atom of the acid groups carried by the ends of said linear prepolymer or polymer chains being substituted by an atom of a metal having a valence of more than 2, said metal atom being linked to another atom of this metal so that M-O-M linkages are formed between the linear prepolymer or polymer chains.

21. The products according to claim 20 in the form of homogeneous gels in a non polar solvent.

22. The products according to claim 1, in which the non polar solvent has a dielectric constant of less than about 5.

23. The products according to claim 21, in which the non polar solvent has a dielectric constant of less than about 5 and is selected among the aliphatic, alicyclic and aromatic solvents.

24. The products according to claim 21, in which the non polar solvent has a dielectric constant of less than about 5 and is selected from the group consisting of pentane, hexane, heptane, octane, decahydronaphthalene, benzene, toluene, tetrahydronaphthalene, gasolines for motor vehicles, petroleum and mineral oils.

25. The products according to claim 20 containing linear polymer chains selected from the group consisting of the polybutadienes α,ω-dicarboxylates, the polyisoprenes α,ω-dicarboxylates, the poly α-methylstyrenes α,ω-dicarboxylates, the polystyrenes α,ω-dicarboxylates, the poly-tert.butylstyrenes α,ω-dicarboxylates, the poly(ethylene oxides)α,ω-dicarboxylates, the poly(propylene oxides)α,ω-dicarboxylates, the butadiene-acrylonitrile copolymers α,ω-dicarboxylates, the polyisobutylenes α,ω-dicarboxylates and the polyacrylates α,ω-dicarboxylates of metals having a valence of more than 2.

26. The products according to claim 21, in which the metal is selected from the group consisting of titanium, zirconium and cerium.

* * * * *